United States Patent
Danzl et al.

(10) Patent No.: US 6,980,631 B1
(45) Date of Patent: Dec. 27, 2005

(54) SYSTEM AND METHOD FOR REPORTING CALLS

(75) Inventors: Kirk C. Danzl, Brooklyn Park, MN (US); Andrew Armstrong, Minneapolis, MN (US); John Borowicz, Minnetrista, MN (US)

(73) Assignee: CallVision, Inc., Seattle, WA (US)

( * ) Notice: Subject to any disclaimer, the term of this patent is extended or adjusted under 35 U.S.C. 154(b) by 0 days.

(21) Appl. No.: 09/441,822

(22) Filed: Nov. 17, 1999

Related U.S. Application Data

(60) Provisional application No. 60/108,731, filed on Nov. 17, 1998.

(51) Int. Cl.[7] .............................................. H04M 15/00
(52) U.S. Cl. ............................. 379/112.01; 379/114.01; 379/121.05; 379/126; 379/133
(58) Field of Search .......................... 379/22.01, 22.02, 379/32.01, 41, 112.01, 112.05, 112.1, 114.01, 114.08, 114.14, 120, 121.01, 121.05, 126, 127.01, 133–134, 116

(56) References Cited

U.S. PATENT DOCUMENTS

| | | | | |
|---|---|---|---|---|
| 4,853,852 A | | 8/1989 | Rosen ........................ | 364/401 |
| 5,101,425 A | | 3/1992 | Darland et al. ............... | 379/34 |
| 5,109,399 A | * | 4/1992 | Thompson | |
| 5,237,157 A | | 8/1993 | Kaplan ........................ | 235/375 |
| 5,425,087 A | | 6/1995 | Gerber et al. | |
| 5,504,810 A | * | 4/1996 | McNair | |
| 5,606,600 A | | 2/1997 | Elliott et al. ................. | 379/112 |
| 5,623,590 A | | 4/1997 | Becker et al. ............... | 395/326 |
| 5,754,634 A | | 5/1998 | Kay et al. | |
| 5,799,073 A | * | 8/1998 | Fleischer et al. | |
| 5,896,445 A | * | 4/1999 | Kay et al. | |
| 5,901,214 A | * | 5/1999 | Shaffer et al. | |
| 5,999,604 A | * | 12/1999 | Walter | |
| 6,134,307 A | * | 10/2000 | Brouckman et al. | |
| 6,169,896 B1 | * | 1/2001 | Sant et al. | |
| 6,377,993 B1 | * | 4/2002 | Brandt et al. | |
| 6,381,306 B1 | * | 4/2002 | Lawson et al. | |

* cited by examiner

*Primary Examiner*—Duc Nguyen
(74) *Attorney, Agent, or Firm*—Darby & Darby PC; Jamie L. Wiegand

(57) ABSTRACT

A system and method is provided for reporting calls. The system first receives call transaction data from a telephone company. The system verifies the validity of the data before proceeding with processing the data. Next the data is geo-coded so that the calls can be traced to a given location. The resultant call detail data is then transmitted to parties who have subscribed to the service. A report generator uses the call detail data to generate tables, graphs, and maps which are useful to the subscriber. When generating maps, the report generator uses the geocoded information to geographically locate given calls on a map.

16 Claims, 16 Drawing Sheets

Figure 3:
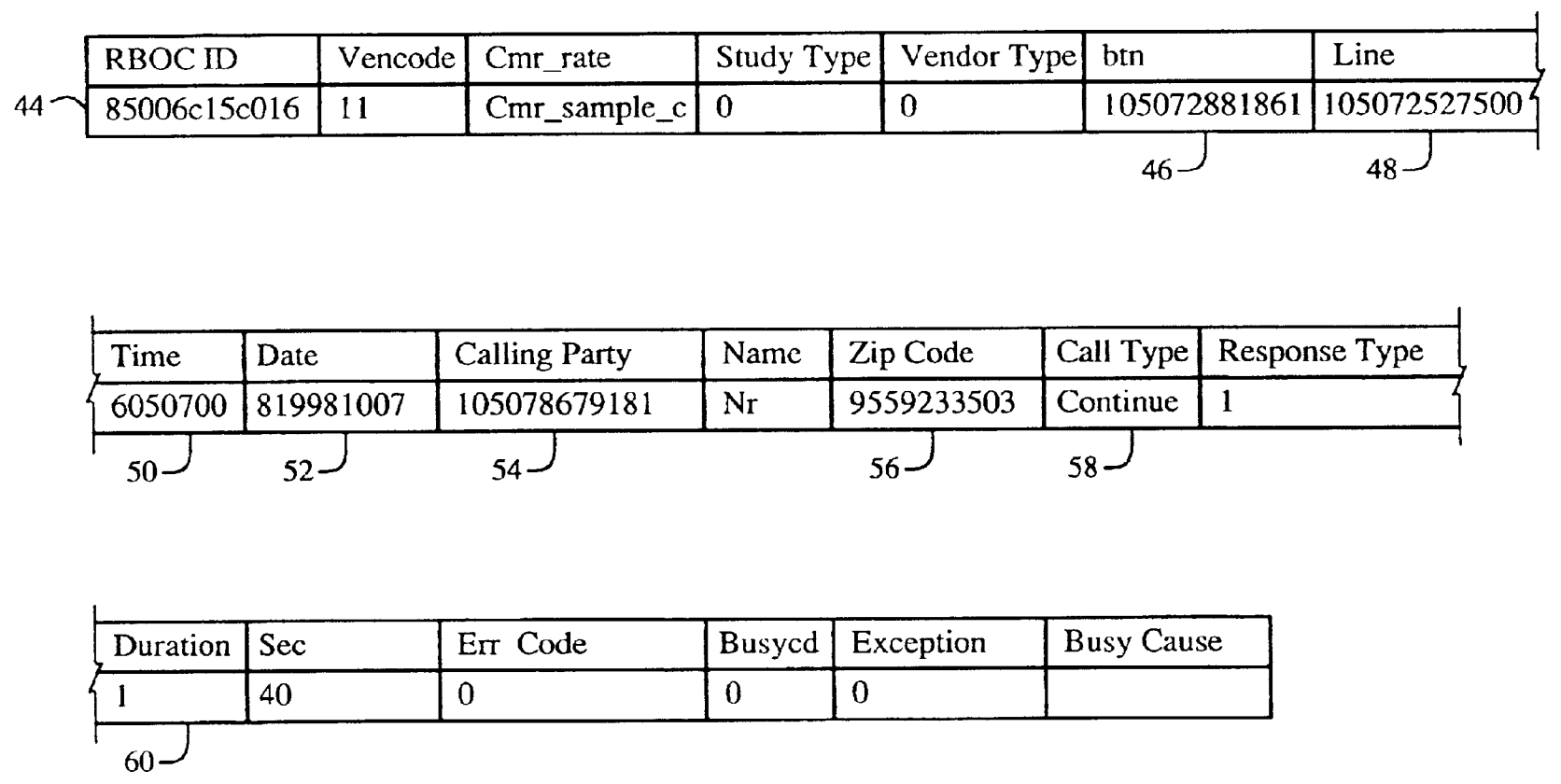

| RBOC ID | Vencode | Cmr_rate | Study Type | Vendor Type | btn | Line |
|---|---|---|---|---|---|---|
| 85006c15c016 | 11 | Cmr_sample_c | 0 | 0 | 1050072881861 | 1050072527500 |

44 ⌐           52 ⌐           46 ⌐   48 ⌐

| Time | Date | Calling Party | Name | Zip Code | Call Type | Response Type |
|---|---|---|---|---|---|---|
| 6050700 | 819981007 | 1050078679181 | Nr | 9559233503 | Continue | 1 |

50 ⌐           52 ⌐           54 ⌐           56 ⌐           58 ⌐

| Duration | Sec | Err Code | Busycd | Exception | Busy Cause |
|---|---|---|---|---|---|
| 1 | 40 | 0 | 0 | 0 | |

| FILE_ID | CDATE | CTIME | DN | CPN | CALL_TYPE | CALL_DISP | CALL_STAT |
|---|---|---|---|---|---|---|---|
|  | 8/22/98 | 04:18:15 PM | 5135551212 | 9375787400 | 1 | 2 | 0 |
|  | 8/22/98 | 04:18:36 PM | 5135551212 | 8122562495 | 1 | 0 | 1 |
|  | 8/22/98 | 04:32:30 PM | 5135551212 | 7405458420 | 1 | 0 | 1 |
|  | 8/22/98 | 06:39:51 PM | 5135551212 | 1111111111 | 1 | 0 | 1 |
|  | 8/23/98 | 08:55:34 AM | 5135551212 | 5555555555 | 1 | 0 | 1 |
|  | 8/23/98 | 09:09:07 AM | 5135551212 | 1111111111 | 0 | 1 | 0 |
|  | 8/23/98 | 09:52:46 AM | 5135551212 | 1111111111 | 1 | 0 | 1 |
|  | 8/23/98 | 12:22:41 PM | 5135551212 | 1111111111 | 1 | 0 | 1 |
|  | 8/23/98 | 12:48:28 PM | 5135551212 | 5133901888 | 1 | 0 | 1 |
|  | 8/23/98 | 01:41:09 PM | 5135551212 | 6066207160 | 1 | 0 | 1 |
|  | 8/23/98 | 01:53:10 PM | 5135551212 | 9378565488 | 1 | 0 | 1 |
|  | 8/23/98 | 02:17:51 PM | 5135551212 | 1111111111 | 1 | 2 | 0 |
|  | 8/23/98 | 03:32:58 PM | 5135551212 | 1111111111 | 1 | 0 | 1 |
|  | 8/23/98 | 03:47:34 PM | 5135551212 | 5136598931 | 1 | 3 | 0 |
|  | 8/23/98 | 05:30:56 PM | 5135551212 | 7658471638 | 1 | 0 | 1 |
|  | 8/23/98 | 07:16:25 PM | 5135551212 | 9372740967 | 1 | 0 | 1 |
|  | 8/23/98 | 11:09:44 PM | 5135551212 | 1111111111 | 1 | 0 | 1 |
|  | 8/21/98 | 09:06:43 AM | 5135551212 | 6066354067 | 0 | 0 | 1 |
|  | 8/20/98 | 09:17:34 AM | 5135551212 | 6065895650 | 1 | 0 | 1 |
|  | 8/19/98 | 08:33:35 AM | 5135551212 | 6068697769 | 1 | 2 | 0 |
|  | 8/19/98 | 09:05:04 AM | 5135551212 | 6066896779 | 1 | 0 | 1 |
|  | 8/19/98 | 05:22:59 PM | 5135551212 | 6066722444 | 1 | 1 | 1 |
|  | 8/21/98 | 08:55:45 PM | 5135551212 | 6069218116 | 0 | 0 | 1 |
|  | 8/17/98 | 11:59:37 AM | 5135551212 | 6062198116 | 1 | 0 | 1 |
|  | 8/20/98 | 02:43:02 PM | 5135551212 | 6062198116 | 1 | 0 | 1 |
|  | 8/18/98 | 04:59:46 PM | 5135551212 | 6062916544 | 1 | 0 | 0 |
|  | 8/19/98 | 10:21:30 AM | 5135551212 | 6062916544 | 1 | 0 | 1 |
|  | 8/19/98 | 09:26:36 AM | 5135551212 | 6069214564 | 1 | 0 | 1 |

Figure 8

| CALL_DUR | XACTION | CPN_NAME | POSTALCODE | LONGITUDE | LATITUDE | Q_BYTES | MISC |
|---|---|---|---|---|---|---|---|
| 0 | | Unavailable | | -84.193714 | 39.759868 | S | |
| 260 | | Unavailable | | -85.384117 | 38.733633 | S | |
| 200 | | Unavailable | | -82.961757 | 40.232652 | S | |
| 360 | | Unavailable | | 0.000000 | 0.000000 | U | |
| 2730 | | Unavailable | | 0.000000 | 0.000000 | U | |
| 240 | | Unavailable | | 0.000000 | 0.000000 | U | |
| 0 | | Unavailable | | 0.000000 | 0.000000 | U | |
| 230 | | Unavailable | | -84.519930 | 39.102459 | S | |
| 110 | | Unavailable | | -84.519930 | 39.102459 | S | |
| 220 | | Unavailable | | -84.364952 | 39.623529 | S | |
| 100 | | Unavailable | | 0.000000 | 0.000000 | U | |
| 0 | | Unavailable | | 0.000000 | 0.000000 | U | |
| 50 | | Unavailable | | -84.519930 | 39.102459 | S | |
| 0 | | Unavailable | | -84.941571 | 40.049073 | S | |
| 220 | | Unavailable | | -84.225906 | 39.790287 | S | |
| 70 | | Unavailable | | 0.000000 | 0.000000 | U | |
| 2720 | | Unavailable | 410019720 | -84.419803 | 38.880692 | A | |
| 50 | | Unavailable | 410058211 | -84.722085 | 39.028344 | A | |
| 4400 | | Unavailable | 410059751 | -84.737297 | 39.075182 | A | |
| 0 | | Unavailable | 410059751 | -84.737297 | 39.075182 | A | |
| 2180 | | Unavailable | 410069608 | -84.369442 | 38.787168 | A | |
| 2850 | | Unavailable | 410111135 | -84.530487 | 39.082738 | A | |
| 280 | | Unavailable | 410111135 | -84.530487 | 39.082738 | A | |
| 760 | | Unavailable | 410111135 | -84.530487 | 39.082738 | A | |
| 3450 | | Unavailable | 410111160 | -84.529001 | 39.082483 | A | |
| 1610 | | Unavailable | 410111160 | -84.529001 | 39.082483 | A | |
| 710 | | Unavailable | 410111160 | -84.529001 | 39.082483 | A | |

Figure 8 (Continued)

Geocoding Logic Hierarchy

| Criterion | | | | Value |
|---|---|---|---|---|
| CASE 1 | | | | |
| IF | 9 digit zip exists in zip field | & exists in -> | 9 digit zip DB | A |
| | otherwise 9 digit zip (1st 5 digits) | exists in -> | 5 digit zip DB | B |
| | otherwise 9 digit zip (1st 3 digits) | exists in -> | 3 digit zip DB | C |
| | otherwise npanxx of calling # field | exists in -> | npanxx DB | D |
| | otherwise npa of calling # field | exists in -> | nap DB | E |
| | otherwise use special value indicating unknown origin | | | F |
| CASE 2 | | | | |
| otherwise, IF | 6, 7, or 8 digit zip exists in zip field (bad data) | | | |
| AND | npanxx of calling # field | exists in -> | npanxx DB | G |
| | otherwise npa of calling # field | exists in -> | nap DB | H |
| | otherwise use special value indicating unknown origin | | | I |
| CASE 3 | | | | |
| otherwise, IF | 5 digit zip exists in zip field | & exists in -> | 5 digit zip DB | J |
| | otherwise 5 digit zip (1st 3 digits) | exists in -> | 3 digit zip DB | K |
| | otherwise npanxx of calling # field | exists in -> | npanxx DB | L |
| | otherwise npa of calling # field | exists in -> | nap DB | M |
| | otherwise use special value indicating unknown origin | | | N |
| CASE 4 | | | | |
| otherwise, IF | < 5 digit zip exists in zip field (bad data) | | | |
| AND | npanxx of calling # field | exists in -> | npanxx DB | P |
| | otherwise npa of calling # field | exists in -> | nap DB | Q |
| | otherwise use special value indicating unknown origin | | | R |
| CASE 5 | | | | |
| otherwise, IF | 0 or null exists in zip field (no zip) | | | |
| AND | npanxx of calling # field | exists in -> | npanxx DB | S |
| | otherwise npa of calling # field | exists in -> | nap DB | T |
| | otherwise use special value indicating unknown origin | | | U |

Table 1

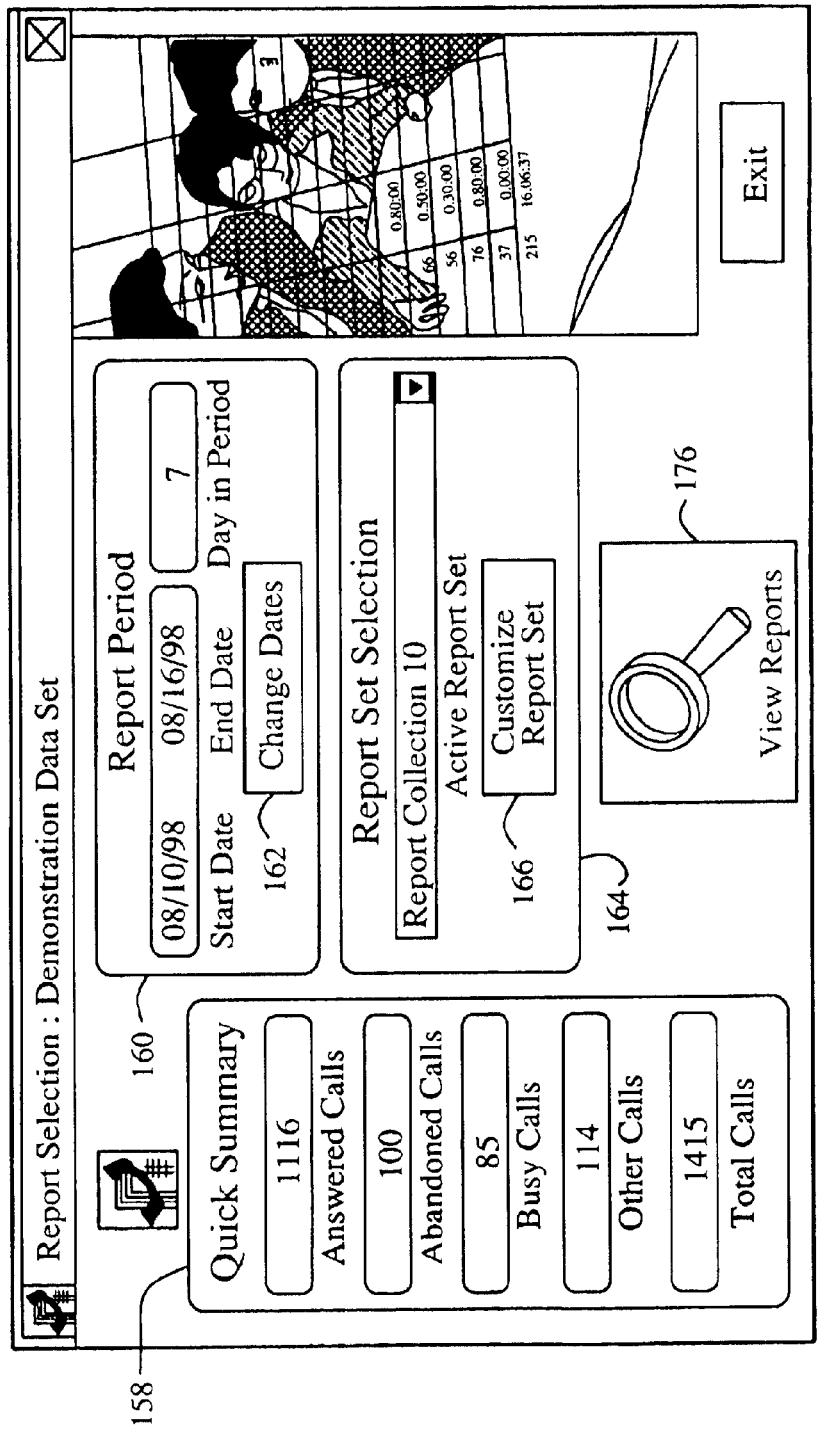
Appendix A

| Mon | Tue | Wed | Thu | Fri | Sat | Sun |
|---|---|---|---|---|---|---|
| 27 | 28 | 29 | 30 | 31 | 1 | 2 |
| 3 | 4 | 5 | 6 | 7 | 8 | 9 |
| | | | *ACTIVE* Available | | | |
| 17 | 18 | 19 | 20 Available | 21 | 22 | 23 |
| 24 | 25 | 26 | 27 | 28 | 29 | 30 |
| 31 | 1 | 2 | 3 | 4 | 5 | 6 |

August 1998

Appendix B

Customize Report Sets

Report Collection 10

Report Sets

Reports in Sets: 1

[New] [Copy] [Rename] [Clear] [Delete]

Incoming & Outgoing

Select 172 Call Types

174 ⦿ Select Reports
○ Select Telephones

| Weekly View | Monthly View | Callers/Areas | Multi Location | Trends |

|  | TABLE | GRAPH | MAP |
|---|---|---|---|
| Summary | | | |
| Summary | ☑ | ☐ | ☐ |
| Call Totals | ☐ | ☐ | |
| Usage | | | |
| Call Duration Distribution | ☐ | ☐ | |
| Total Call Duration | ☐ | ☐ | |
| Average Call Duration | ☐ | ☐ | |

|  | TABLE | GRAPH | MAP |
|---|---|---|---|
| Call Types | | | |
| Call Type by Day (Weekly Total) | ☐ | ☐ | ☐ |
| Call Type by Hour (Daily Detail) | ☐ | ☐ | ☐ |
| Call Type by Hour (Weekly Total) | ☐ | ☐ | ☐ |
| Answered Totals | ☐ | ☐ | |
| Busy Totals | ☐ | ☐ | |
| Abandoned Totals | ☐ | ☐ | |
| Other Totals | ☐ | ☐ | |

170

[Tips] [OK]

Appendix C

New ZIP Codes        October 26, 1998 - November 1, 1998
New ZIP codes discovered in the current date range ranked by answered call count

| Zip Code | State | Call Count | First Call Date & Time | Last Call Date & Time | Total Duration |
|---|---|---|---|---|---|
| 55402 | MN | 11 | 10/26/98 11:07:00 AM | 10/30/98 02:46:00 PM | 0:27:40.0 |
| 55416 | MN | 11 | 10/26/98 12:11:00 PM | 10/29/98 02:37:00 PM | 0:11:25.0 |
| 84111 | UT | 6 | 10/26/98 09:56:00 AM | 10/28/98 02:15:00 PM | 0:31:12.0 |
| 55343 | MN | 6 | 10/26/98 01:38:00 PM | 10/30/98 11:57:00 AM | 0:14:28.0 |
| 56304 | MN | 5 | 10/26/98 06:43:00 PM | 10/28/98 05:47:00 PM | 0:44:51.0 |
| 85012 | AZ | 4 | 10/27/98 05:15:00 PM | 10/29/98 05:48:00 PM | 0:06:14.0 |
| 55347 | MN | 4 | 10/26/98 06:51:00 AM | 10/28/98 02:43:00 PM | 0:02:31.0 |
| 98191 | WA | 3 | 10/26/98 10:34:00 AM | 10/29/98 06:09:00 PM | 0:16:07.0 |
| 55104 | MN | 3 | 10/26/98 11:48:00 AM | 10/27/98 11:30:00 AM | 0:03:12.0 |
| 55415 | MN | 3 | 10/27/98 05:34:00 PM | 10/30/98 01:03:00 PM | 0:02:17.0 |
| 80132 | CO | 3 | 10/26/98 12:57:00 PM | 10/26/98 02:57:00 PM | 0:01:24.0 |
| 55425 | MN | 2 | 10/26/98 04:25:00 PM | 10/28/98 03:56:00 PM | 0:06:05.0 |
| 98188 | WA | 2 | 10/28/98 01:26:00 PM | 10/28/98 01:29:00 PM | 0:05:34.0 |
| 83204 | ID | 2 | 10/30/98 11:09:00 AM | 10/30/98 11:09:00 AM | 0:04:48.0 |
| 55431 | MN | 2 | 10/26/98 03:59:00 PM | 10/30/98 09:44:00 AM | 0:03:39.0 |
| 55124 | MN | 2 | 10/27/98 02:08:00 PM | 10/27/98 02:10:00 PM | 0:03:07.0 |
| 55364 | MN | 2 | 10/27/98 03:50:00 PM | 10/27/98 03:50:00 PM | 0:00:46.0 |
| 55437 | MN | 2 | 10/28/98 05:11:00 PM | 10/29/98 03:25:00 PM | 0:00:29.0 |
| 55305 | MN | 1 | 10/27/98 03:20:00 PM | 10/27/98 03:20:00 PM | 0:09:54.0 |
| 85283 | AZ | 1 | 10/28/98 05:44:00 PM | 10/28/98 05:44:00 PM | 0:07:33.0 |
| 85024 | AZ | 1 | 10/27/98 05:41:00 PM | 10/27/98 05:41:00 PM | 0:04:06.0 |
| 80202 | CO | 1 | 10/30/98 01:36:00 PM | 10/30/98 01:36:00 PM | 0:03:35.0 |
| 55118 | MN | 1 | 10/30/98 08:37:00 AM | 10/30/98 08:37:00 AM | 0:03:17.0 |
| 97401 | OR | 1 | 10/29/98 02:13:00 PM | 10/29/98 02:13:00 PM | 0:02:32.0 |
| 80206 | CO | 1 | 10/28/98 10:09:00 AM | 10/28/98 10:09:00 AM | 0:02:02.0 |
| 68144 | NE | 1 | 10/28/98 03:14:00 PM | 10/28/98 03:14:00 PM | 0:01:51.0 |
| 55391 | MN | 1 | 10/28/98 05:36:00 PM | 10/28/98 05:36:00 PM | 0:01:48.0 |
| 55011 | MN | 1 | 10/26/98 02:30:00 PM | 10/26/98 02:30:00 PM | 0:01:47.0 |
| 85255 | AZ | 1 | 10/27/98 05:55:00 PM | 10/27/98 05:55:00 PM | 0:01:22.0 |
| 99216 | WA | 1 | 10/30/98 11:29:00 AM | 10/30/98 11:29:00 AM | 0:01:11.0 |
| 97204 | OR | 1 | 10/26/98 02:08:00 PM | 10/26/98 02:08:00 PM | 0:00:57.0 |
| 55113 | MN | 1 | 10/26/98 03:59:00 PM | 10/26/98 03:59:00 PM | 0:00:43.0 |
| 68102 | NE | 1 | 10/26/98 12:05:00 PM | 10/26/98 12:05:00 PM | 0:00:41.0 |
| 98004 | WA | 1 | 10/30/98 03:32:00 PM | 10/30/98 03:32:00 PM | 0:00:41.0 |
| 55422 | MN | 1 | 10/26/98 11:12:00 AM | 10/26/98 11:12:00 AM | 0:00:20.0 |
| 55102 | MN | 1 | 10/27/98 11:47:00 AM | 10/27/98 11:47:00 AM | 0:00:07.0 |
| 55427 | MN | 1 | 10/26/98 04:09:00 PM | 10/26/98 04:09:00 PM | 0:00:06.0 |
| 55404 | MN | 1 | 10/26/98 04:26:00 PM | 10/26/98 04:26:00 PM | 0:00:05.0 |
| 55420 | MN | 1 | 10/26/98 10:05:00 AM | 10/26/98 10:05:00 AM | 0:00:03.0 |

Appendix D

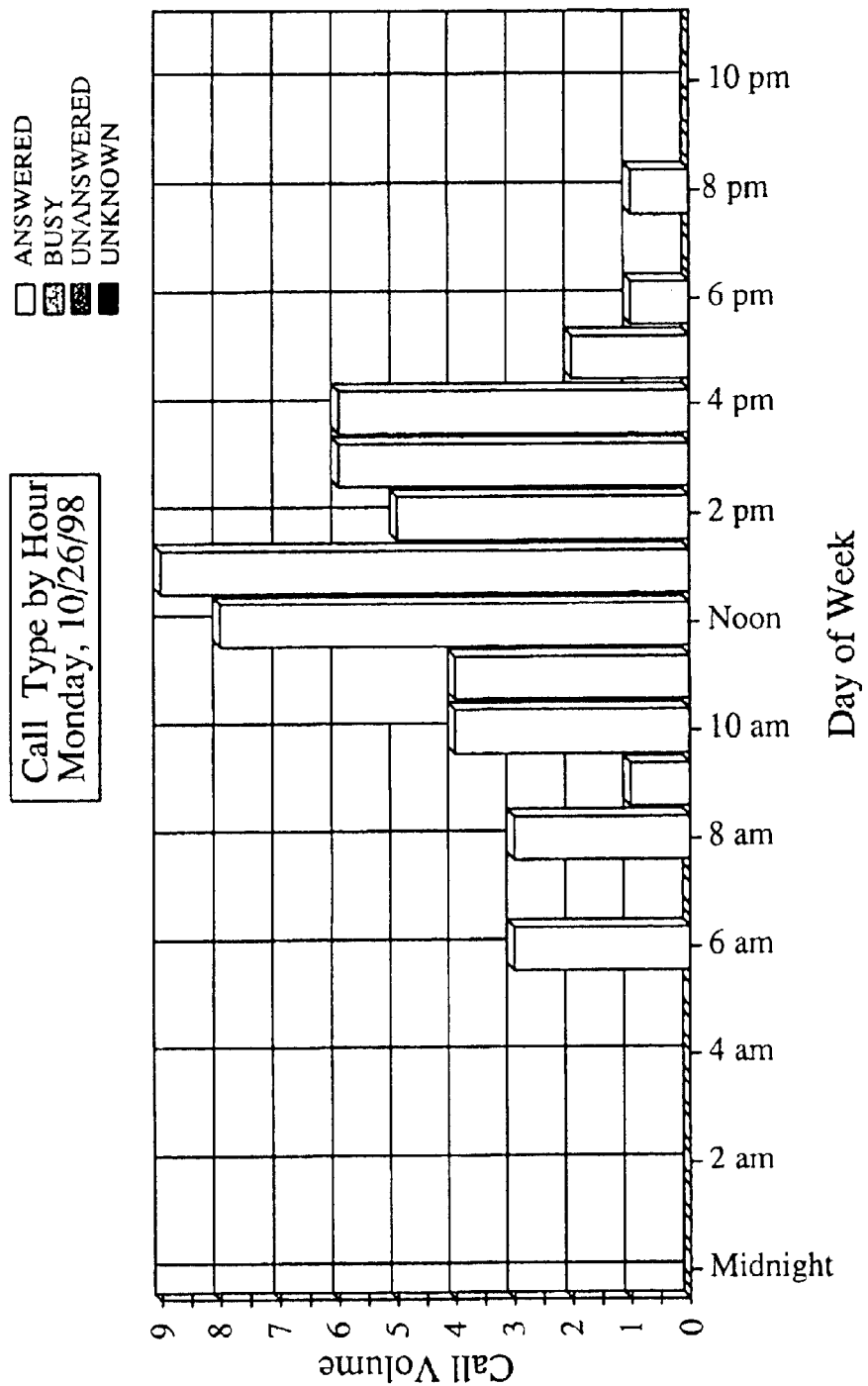

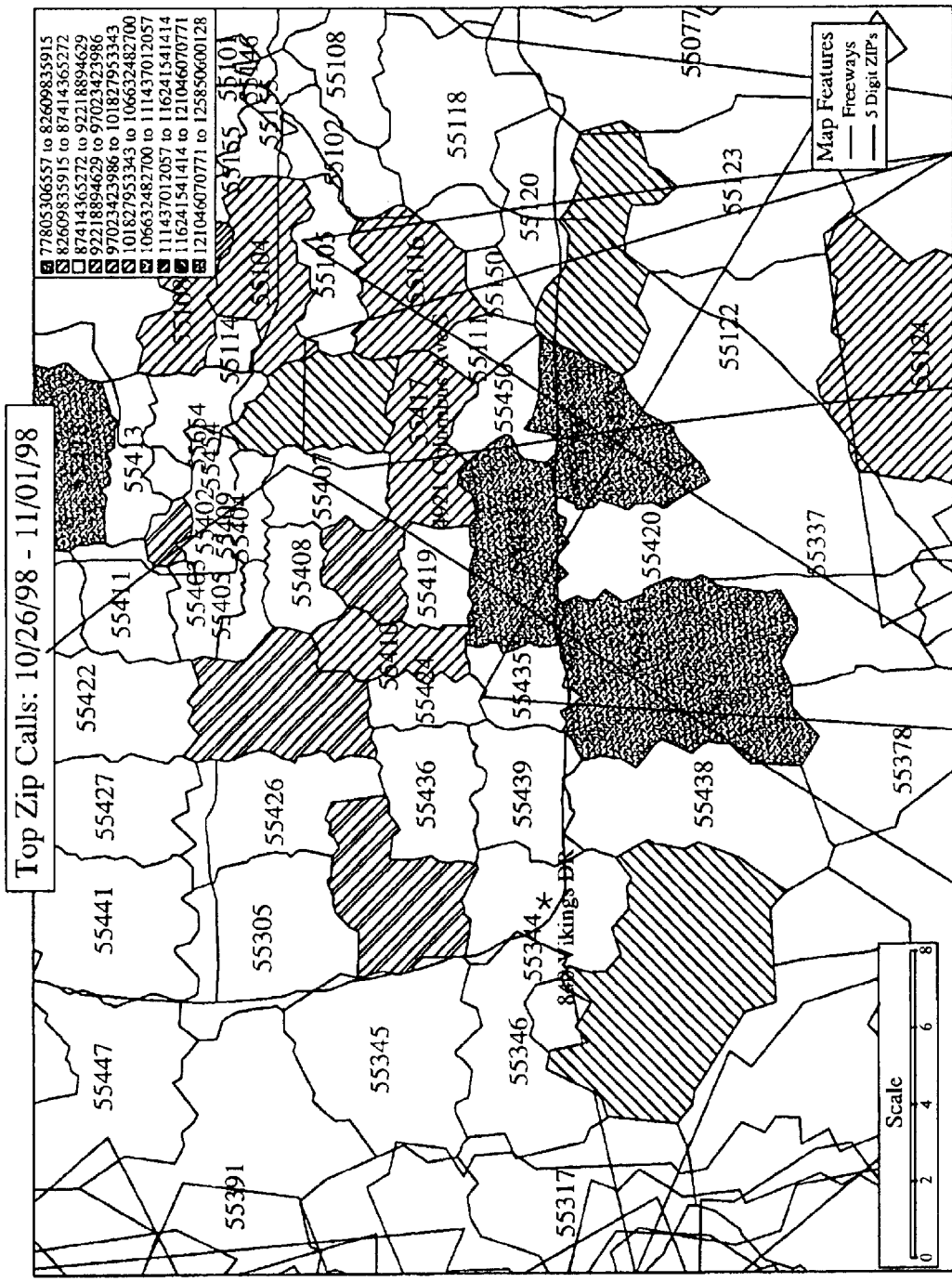

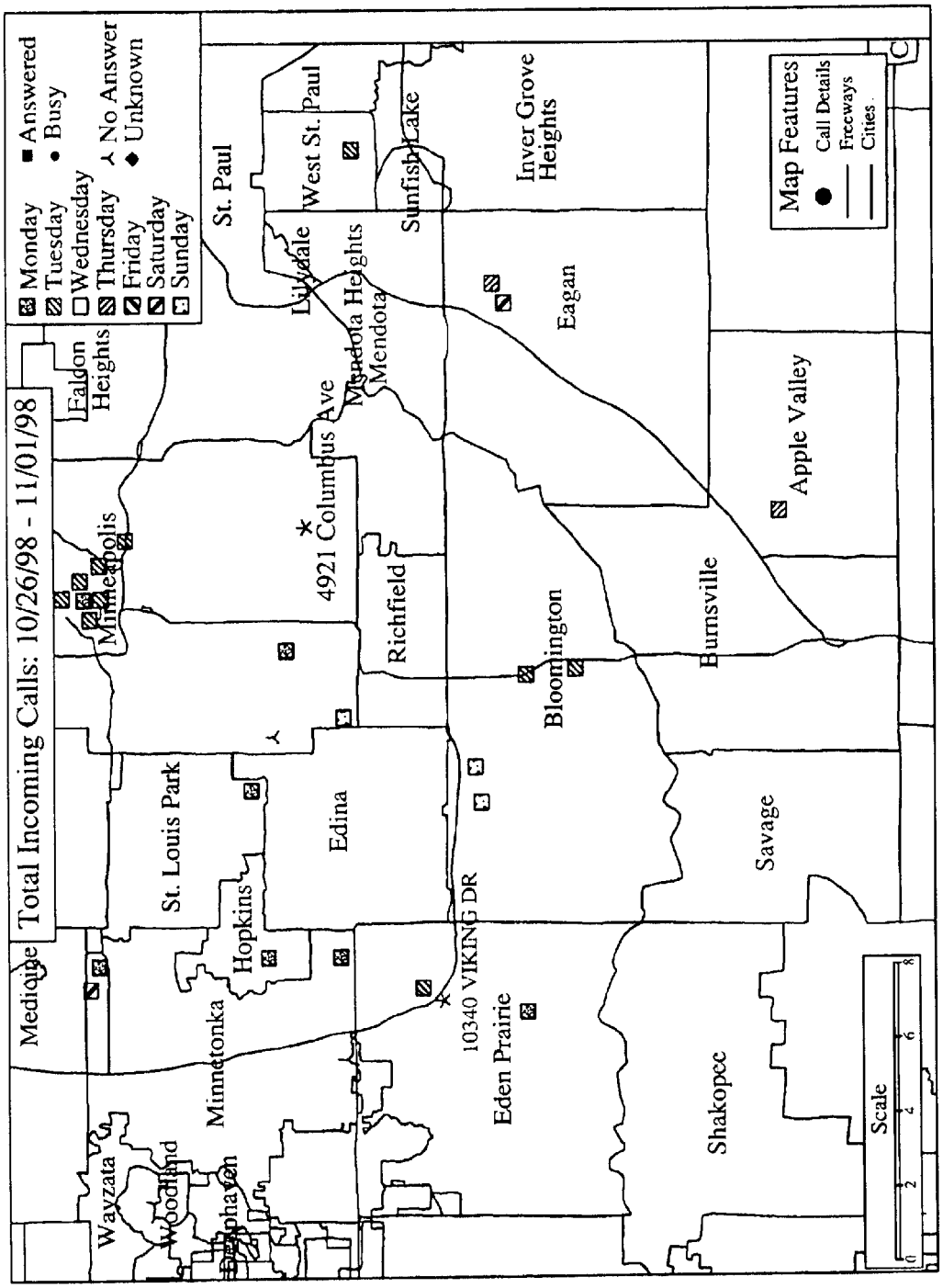

SYSTEM AND METHOD FOR REPORTING CALLS

REFERENCE TO PROVISIONAL APPLICATION

The present application hereby makes reference to and claims priority from Provisional Patent Application No. 60/108,731, filed Nov. 17, 1998, entitled System and Method for Reporting Calls.

BACKGROUND OF THE INVENTION

The present invention deals with call record reporting. More specifically, the present invention deals with arranging and reporting call record information to customers using, in some cases, geographically descriptive information.

Current telecommunications networks are capable of tracking and recording call transaction data, i.e., information associated with a given telephone call, and using this data to support call processing and to provide accurate billing information to customers. Systems have also been developed which strive to provide the customer with quite detailed call transaction data which the customer may use for specific purposes. U.S. Pat. No. 5,425,087 to Gerber, for example, discloses a system that reports the length of each call, the length of time that a party was placed on hold, and the telephone number of the other party to a system administrator so that the telephone activities of employees can be monitored in real time.

U.S. Pat. No. 5,754,634 to Kay, et al. discloses a system for tracking calls made to individual predetermined subscribers and automatically reporting information, including demographic breakdowns of calls, such as time of day, day of week, and location of origin, to the subscriber. The disclosed system makes use of the Advanced Intelligent Network (AIN) and Integrated Service Control Point (ISCP) platform to provide such information to those subscribers desirous of such service. The ISCP captures the time and date of the call, the originating call number and the subscriber's call number. ISCP network data is collected for all calls placed to service subscribers by the AIN Data and Reports System (DRS) DRS is an operation support utility that provides service analysis on the collected data. The data may be sorted on the basis of called subscriber number and transmitted at periodic intervals to a report processor.

The call originating telephone number for each call may be used to access an existing telephone system billing database to obtain caller information, including zip code. The zip code, in turn, can be used to access a commercially available census database to provide further demographic information. For example, demographics for a given zip code may include median age and median income. Report statistics can match these demographics with a number of calls received as collected at the ISCP.

The calling party number may be supplied through Caller ID or AIN transmission. If this information is available only for calls within a telephone company Local Access and Transport Area (LATA), reports may include detailed breakdown of such calls while categorizing out of LATA calls in more general breakdowns. Detailed zip code results can include number and percentage of residential calls, business calls, homeowners, median income and age. Generalized information may include numbers, averages and percentages of calls in time ranges for days of the week.

The existing arrangements have some drawbacks. In the existing arrangements, a zip code cannot be attached to certain calls. For example, because a telephone company has no billing records for telephone numbers outside of its LATA, it cannot attach a zip code to long distance calls. Further, under the existing arrangement, there is no way to attach a geographical indicator to a call without a zip code. Thus, for many calls, no geographical indicator can be attached. Furthermore, even for calls for which a zip code is attached, there is no indication of an actual geographic location. All the subscriber receives is a zip code. Another drawback of the existing arrangements is that the report that is output to the subscriber is only available in tabular form, which tends to be rather cryptic. Thus, it is difficult and inconvenient for the subscriber to comprehend and absorb the information contained in the tables.

SUMMARY OF THE INVENTION

The present invention can be configured to provide one or more of a variety of advantages. Among the advantages are the flexibility and convenience that it affords the subscriber in choosing the output format in which to view the call data reports. The subscriber has the option of viewing the information in the form of tables, graphs or maps of a multitude of different formats. Particularly advantageous are the various map report formats, which allow the subscriber to easily visualize and digest the information provided by the system. Another advantage of the present invention is its ability to attach a geographical location to calling parties for whom a corresponding zip code is not available. Yet another advantage of the present invention is that it verifies the validity of the call transaction data before proceeding with the processing of the data.

The present invention is a system and method for processing and reporting telephone records. The system first receives call transaction data from a telephone company. The system verifies the validity of the data before proceeding with processing the data. Next the data is geocoded so that the calls can be traced to a given location. A report generator then uses the call detail data to generate reports relating to the call detail data.

The report generator may be operated by the provider of the service embodying the present invention, or may be operated by the subscriber to the service on the subscriber's own computer, depending on the preference of the subscriber. Where the service provider generates the reports, a paper copy of the reports in formats selected by the subscriber is delivered to the subscriber. If the subscriber elects to generate the reports, the call detail data is delivered to the subscriber via means selected by the subscriber, illustratively via a computer network or on diskette. The report generator produces tables, graphs, and maps which are useful to the subscriber. When generating maps, the report generator uses the geocoded information to geographically locate given calls on a map.

The subscriber may use generated reports to do detailed marketing research. For example, the subscriber can determine from which geographical areas the greatest response was received following, for example, a given television advertisement and adjust its advertising strategy accordingly. The subscriber may also use the generated reports to assist in staffing decisions. For example, the subscriber can determine when during the day, and on which lines, incoming calls were unanswered or met with busy signals.

BRIEF DESCRIPTION OF THE DRAWINGS

FIG. 3 is an example of a call record, which is provided by the telephone company for processing by the present invention.

FIG. 8 is a table exemplifying call detail data that may be produced according to the present invention.

Table 1 demonstrates the geocoding logic hierarchy according to the present invention.

Appendix A contains an exemplary view of a computer screen that may be generated according to the present invention.

Appendix B contains an exemplary view of a computer screen that may be generated according to the present invention.

Appendix C contains an exemplary view of a computer screen that may be generated according to the present invention.

Appendix D contains a table exemplifying a report that may be generated by the report generator according to the present invention.

Appendix E contains a graph exemplifying a report that may be generated by the report generator according to the present invention.

Appendix F contains a map exemplifying a report that may be generated by the report generator according to the present invention.

Appendix G contains a map exemplifying a report that may be generated by the report generator according to the present invention.

DETAILED DESCRIPTION OF THE PREFERRED EMBODIMENTS

Figure 1:
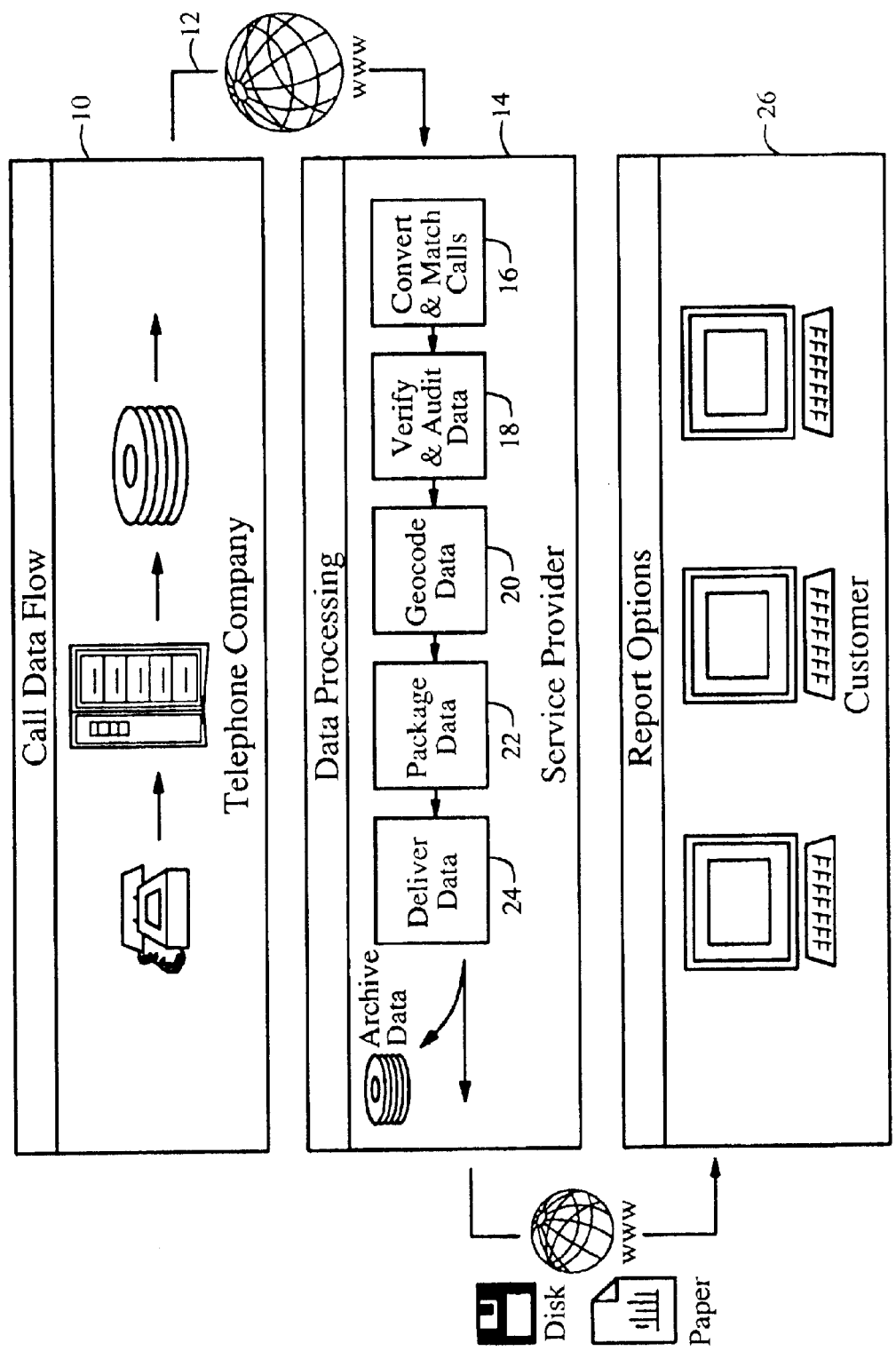
FIG. 1 is a high level block diagram of a system utilizing the present invention.

FIG. 1 provides an overview of the system of the present invention. FIG. 1 shows in block diagram form, telephone company 10, service provider 14, and customer 26. In block 10, the telephone company captures and processes call transaction data for a customer who subscribes to a reporting service employing the system of the present invention. In block 12, the telephone company transmits the call records, via a global computer network (such as the Internet) or other appropriate means, to the provider of the service embodied in the present invention.

In block 14, the service provider processes the call records received from the telephone company. In order to do this, a number of functions are performed. The functions are illustrated by blocks in service provider block 14, and can be performed by any suitable, computer-based systems. In block 16, the system converts the call record data into a format that is compatible with the system's geocoding software and report-generating software. Also in block 16, the call records are matched to the subscriber. In block 18, the system audits and verifies the validity of the data. In block 20, the system geocodes the call data. Thus, for each call, the system attaches a geographic longitude and latitude corresponding to the location of the second party to the call (the subscriber being the first party to the call). In block 22, the call records and the geocoded data are packaged into a call detail file. In block 24, the call detail data is delivered to the subscriber in a suitable way, such as via the Internet, on floppy disk or in paper form.

Block 26 illustrates that the call detail data is fed into a report generator which outputs a report in a format selected by the subscriber. The report generator is run by the subscriber on the subscriber's own computer (unless the subscriber opts for paper delivery, in which case the service provider generates the report). The available report formats include a variety of tables, graphs and maps. If the subscriber selects the map format, the report generator overlays the geocoded data on a map so that the subscriber can see on the map exactly where calls were placed to or received from along with various other information regarding those calls.

Figure 2:
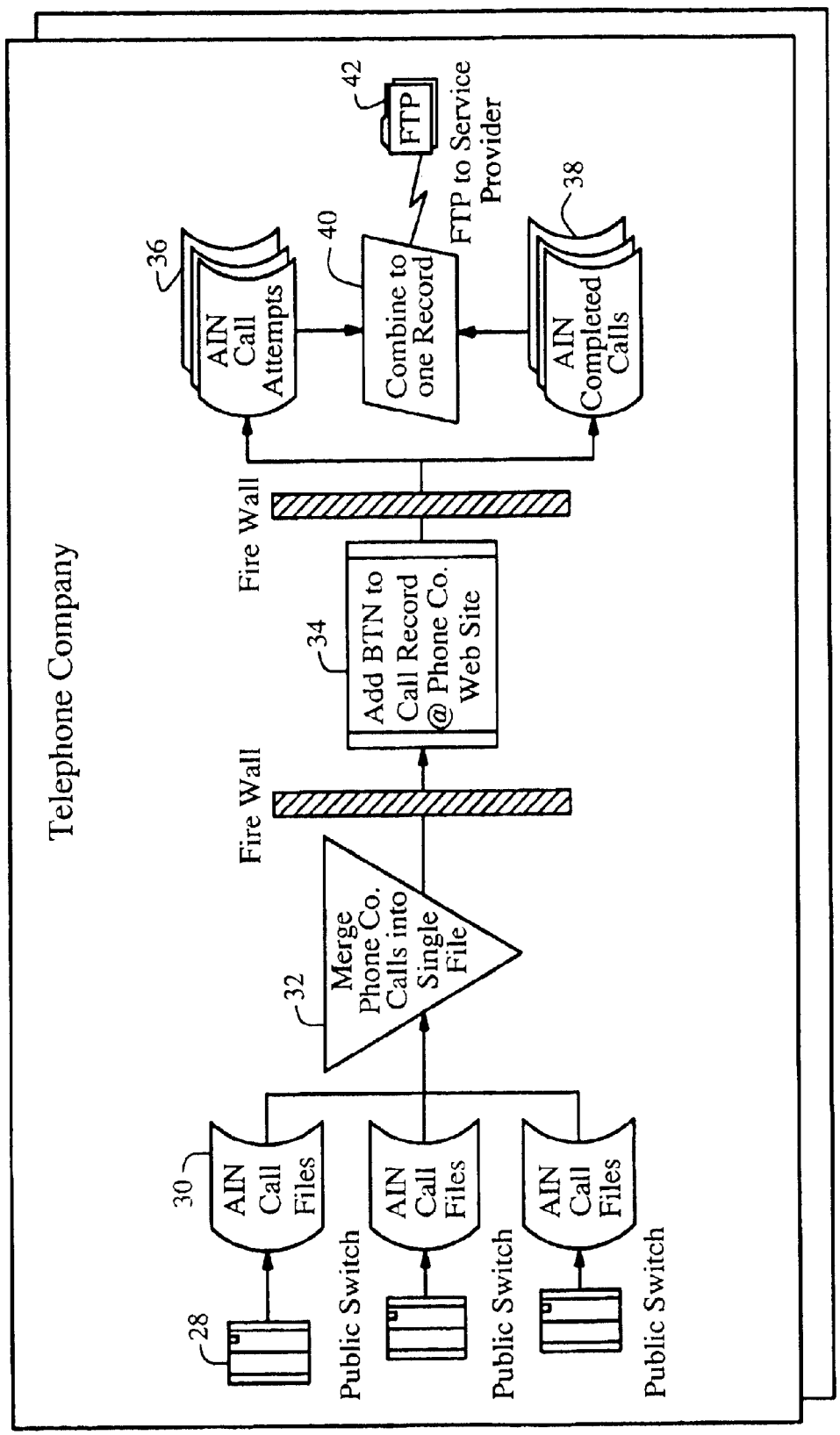
FIG. 2 is a functional block diagram illustrating one embodiment of telephone company call processing.

FIG. 2 provides an illustrative example of the call processing performed by the telephone company as shown in block 10 of FIG. 1. It should be noted that different telephone companies will process their call records in different ways. The present invention is capable of adjusting to the particular processing method employed by a given telephone company. It should also be noted that different telephone companies will transmit their call records to the service provider at different points along the chain illustrated in FIG. 2.

In FIG. 2, at its various switches 28, the telephone company captures call transaction data off of the Advanced Intelligent Network (AIN) and places the data in AIN call files 30 of two types: call attempt files and completed call files. The call attempt files contain call transaction data for all attempted calls, while the completed call files contain call transaction data only for calls that were answered. Call transaction data can include the time, date and duration of the call, the originating call number, the terminating call number, and call status (busy, answered or unanswered). Because the present invention can be used with both outgoing and incoming calls, the subscriber's line number may be either the originating or the terminating call number. The telephone company then combines the AIN call files from its various switches into a single call attempt file and a single completed call file, as shown in block 32.

In block 34, the billing records, including billing telephone number (BTN) and zip code, of the second party to each call are added to the call transaction data files. Billing records may not be available for some calls (long distance calls, for instance). In this illustrative embodiment, the step embodied in block 34 is performed by the telephone company. However, the present invention is also capable of performing this step, as well as all subsequent steps.

Next, the AIN call attempts file 36 and the AIN completed calls file 38 are combined to form one complete call record file, as shown in block 40. This call record file is then transmitted to the service provider by sending it to the service provider's File Transfer Protocol (FTP) 42 server, or other appropriate means. In one illustrative embodiment, the telephone company will transmit the call record data to the service provider at least daily.

FIG. 3 is a printout of a sample single call record 44 that might be transmitted from the telephone company to the service provider. Some of the significant fields include the subscriber billing telephone number (btn) 46, the number of the subscriber's line is 48 used for the call, the time 50 and date 52 of the call, the line number of the calling party 54, the zip code 56 of the calling party, call type 58 and duration 60. Different telephone companies may transmit call records of varying formats. For instance, the call type 58 field of one telephone company might indicate whether the call was answered, unanswered or met with a busy signal, while for a different telephone company might indicate whether the call was incoming or outgoing. Also, the subscriber has the option of receiving records for incoming calls, outgoing calls or both, and the call record will vary accordingly.

Figure 4:
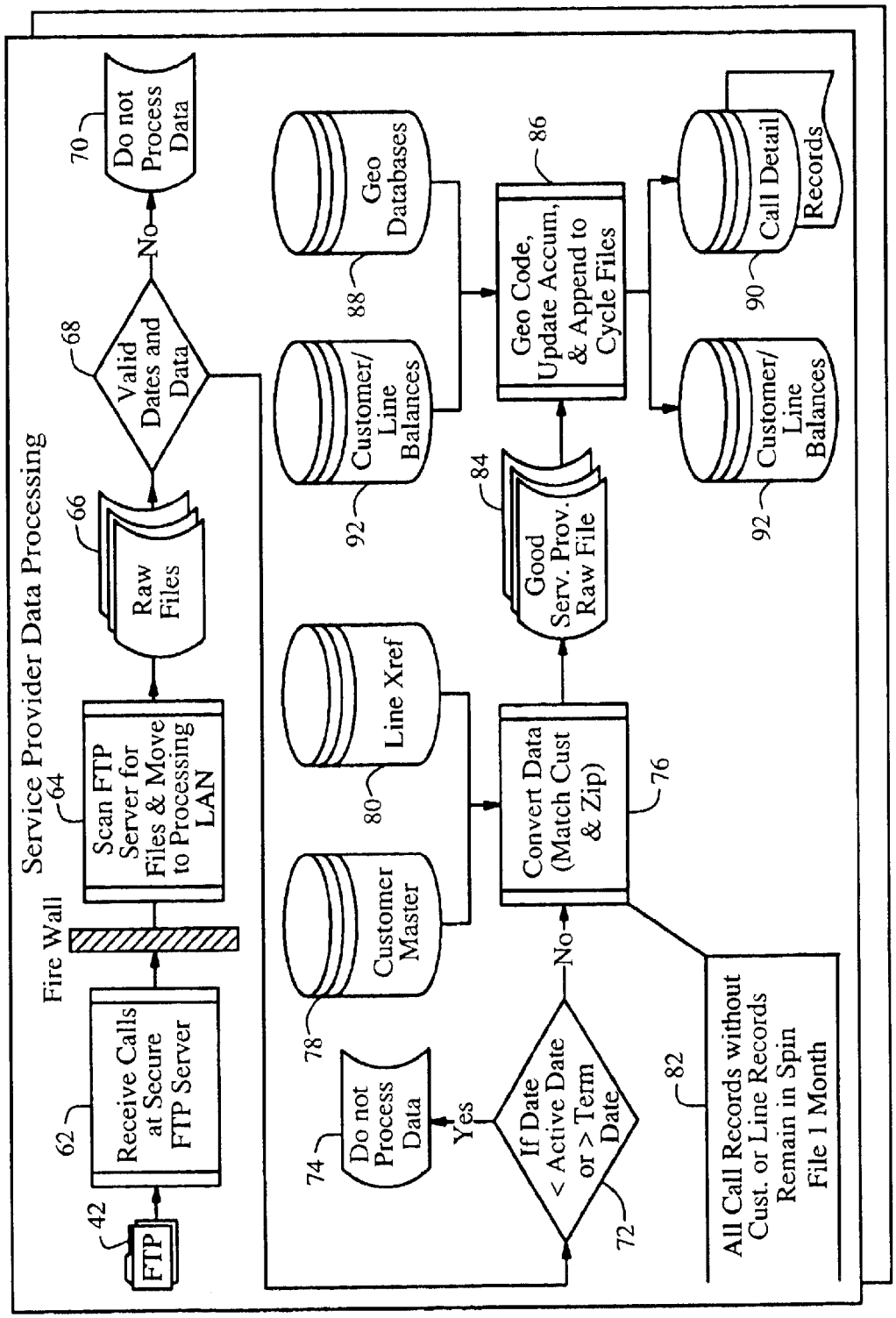
FIG. 4 is a functional block diagram illustrating one embodiment of call processing according to the present invention.

FIG. 4 provides a detailed breakdown of the data processing performed by the service provider as shown in block 14 of FIG. 1. The service provider receives the call record files from the telephone company by any appropriate means. In FIG. 4, the service provider receives the call record data at its secured FTP 42 server, as shown in block 62. In block 64, the FTP server is scanned for files received. Also in block 64, when raw files 66 are received, they are transferred, in one illustrative embodiment, to a local area network processing server.

In block 68, the validity of the call record data raw files 66 is checked. The system searches for anomalies in the data by performing statistical analysis to determine if certain variables fall within established parameters. Examples of variables that are analyzed include the number of calls received, the number of busy calls received and the number of calls for which the status is unknown in a given time period. The system may also check to ensure that calls were received during all hours of the day to determine whether data transmission problems were encountered during any time of the day, or to determine whether the system was temporarily down during any part of the day. The current data is compared to collected statistical data to determine if the current data is generally in line with the collected data. The parameters will vary from one subscriber to another. For example, for one subscriber it may be acceptable for five percent of its calls to be of unknown status, while for another subscriber, one percent may be the highest acceptable percentage of calls of unknown status. The system adjusts the parameters over time and for new situations as new statistical data is collected. The validity check is performed at the overall level, as well as the individual subscriber level. For example, at the overall level, the system compares the newly received raw files 66, in the aggregate against the statistical data maintained for aggregate files. Then, the same types of checks are performed on an individual customer basis. If the call record data is deemed invalid, it is kicked out of the system and not processed further, as shown in block 70. If the data is deemed valid, processing continues at block 72.

In block 72, the system verifies that the subscriber's account was active when the particular call was placed. If the account was terminated or not yet active, the data is not processed, as shown in block 74. In block 76, the call record data is converted into a format that is compatible with the service provider's geocoding software and report-generating software. Also in block 76, the call records are matched to the subscriber. In some cases, the telephone company will provide the customer number as part of the call record data. When that is the case, the system looks up the customer records in both a customer master 78 and a line cross-reference (line xref) 80. The customer master contains customer information (related to a given customer number) collected during an initial set-up procedure in which the customer's account is initialized. The line xref 80 contains a cross-reference between particular telephone line numbers and customer numbers. If the customer number is not in the customer master 78 and the line number is not in the line xref 80, the call record is placed in a spin file for a suitable period of time (such as one month) and processing is re-tried at that time, as shown in block 82.

If the telephone company does not provide the customer number, the system looks up the customer number in the line xref 80. If the line number is not in the line xref 80, again the call record is placed in the spin file for one month, as shown in block 82. Thus the output of block 72 is a good call record file in the service provider's format (good serv. prov. raw file) 84.

In block 86, the call record data is geocoded. The geocoding process attaches to each call the precise longitude and latitude of the geographic centroid, or geographic center, of either the zip (postal) code, area code or exchange code of the second party to the call. Five geographic (geo) databases 88 are maintained, one each for nine-digit zip codes, five-digit zip codes, three-digit zip codes, area codes, and exchange codes. Each database contains the precise longitude and latitude of the geographic centroid for each respective zip, area and exchange code. Table 1 illustrates the geocoding hierarchy.

In case 1, a nine-digit zip code exists in the call record's zip code field. If the same nine-digit zip code exists in the nine-digit zip code database, the longitude and latitude corresponding to that zip code are attached to that call. If the nine-digit zip code is not contained in the nine-digit database, the system looks in the five-digit zip code database for the first five digits of the nine-digit zip code. If that five digit zip code is present, the corresponding longitude and latitude are attached to the call. If the first five digits are not in the five-digit database, the three-digit database is searched for the first three digits of the nine-digit zip code. The three-digit database may be useful, for instance, for new zip codes which are not yet cataloged in the five-digit database. If the first three digits do not exist in the three-digit database, the system searches the exchange code database (designated npanxx DB in Table 1) for the first six digits (designated npanxx) of the line number of the second party to the call (i.e., the area code and exchange). The exchange code database contains data corresponding to particular exchange codes within particular area codes. An exchange code consists of the first three digits of a telephone number after the area code. Thus, if a match is found in the exchange code database, the longitude and latitude corresponding to the geographic centroid corresponding to the identified area code and exchange are attached to the call record. If no match is found in the exchange code database, the area code database (designated nap DB in Table 1) is searched for the area code (designated npa) of the line number. If that is unsuccessful, a special longitude/latitude value indicating unknown origin is attached to the call.

In case 3, a five-digit zip code is provided in the zip code field. If a five-digit zip code exists in the call record's zip code field, a protocol similar to the above is used as shown in Table 1, beginning with a search of the five-digit zip DB and continuing on as described with respect to case 1.

As can be seen in cases 2, 4 and 5, Table 1, if less than five or between five and nine (i.e., six, seven or eight) digits exist in the call record's zip code field, the system presumes that the data is invalid and uses only the line number in geocoding that call as described with respect to case 1.

The system also assigns a value, shown in the far right-hand column of Table 1, to the longitude and latitude specification based on its precision. For example, when the nine-digit zip code database is used to determine the longitude and latitude, a more accurate approximation of the location of the second party to the call is obtained than if the five-digit or three-digit databases are used. The assigned value reflects this degree of accuracy. The assigned value can also be used to indicate the reliability of the data. For example, in cases 2 and 4, it is presumed that the zip code field in the call record contains bad data. There is then an increased probability that other data in the record, including the line number, is also unreliable. The assigned value reflects this reduced level of reliability.

The description now continues with respect to FIG. 4. In block 86, the customer accumulator and line accumulator are also updated. The accumulators tally the number of call records processed during the current cycle for each line and for each subscriber. Cycles are illustratively weekly or monthly. The output of block 86 are the call detail records 90 which are the aggregate of the call record data (good serv. prov. raw file) 84 and the corresponding geocoded data. The call detail records 90 are accumulated until the end of the cycle, at which time they are prepared for distribution to the subscriber. The call detail records are also stored in the customer balance and line balance (customer/line balances) 92 databases, which are used in the validity checks of block 68 and against which statistical analysis is performed.

Figure 5:
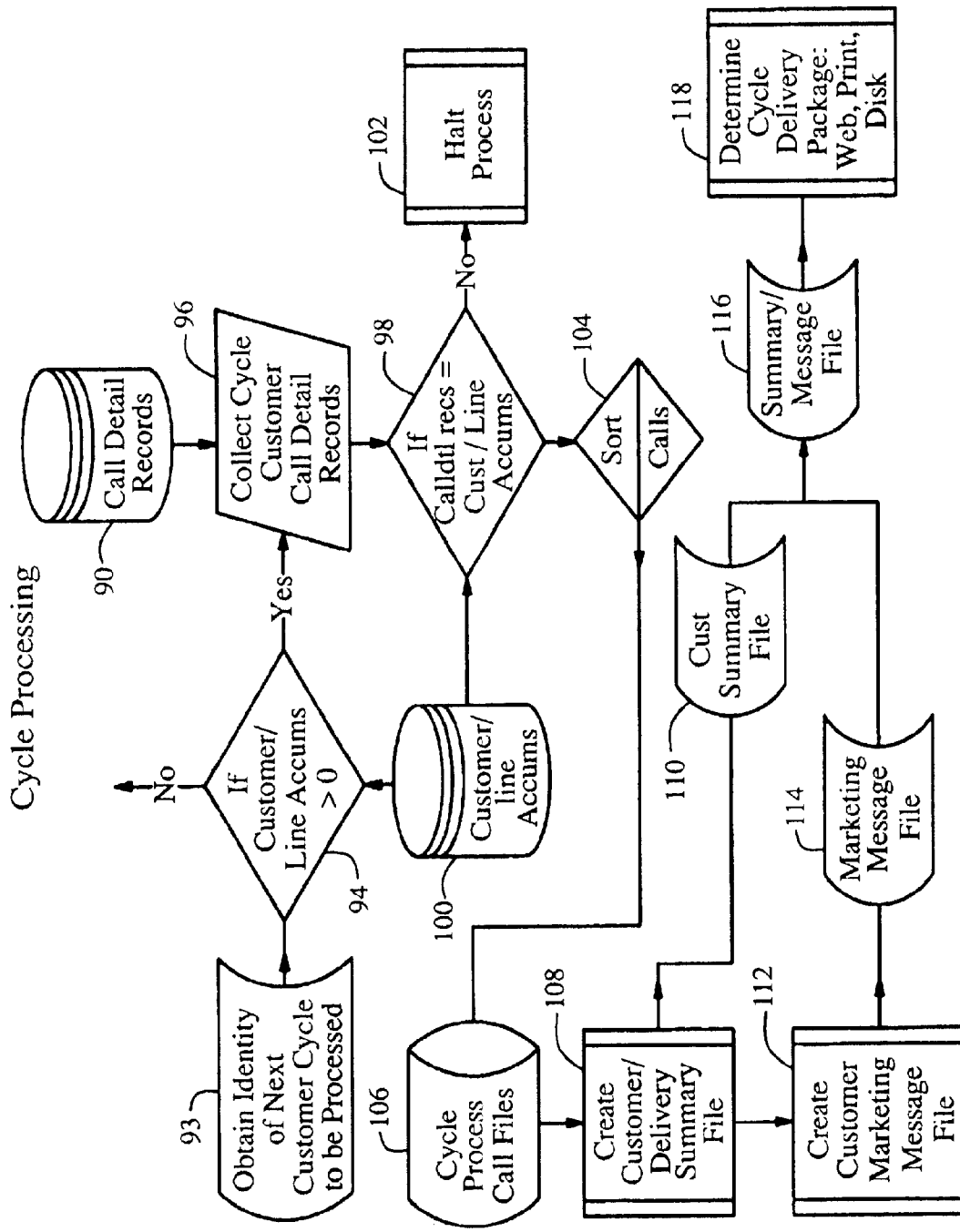
FIG. 5 is a functional block diagram illustrating one embodiment of end-of-cycle processing according to the present invention.

FIG. 5 illustrates the processing of the call detail records which takes place at the end of each cycle. The system first obtains the identity of a customer for which a cycle has ended and to which call detail records must be reported. This is indicated by block 93. In block 94, the system checks whether records have been processed for the given line or given subscriber (depending on whether calls are to be processed for all of the subscriber's lines or for just a given line) during the current cycle. If records have been processed, the call detail records 90 are collected as shown in block 96. In block 98, the system checks whether the number of call detail records 90 is equal to the value held in the accumulator (customer/line accums) 100. If it is not, there may be a problem with the call detail records 90 and the process is halted, as shown in block 102. If (customer/line accums) the accumulator 100 agrees with the call detail records, the calls are sorted as indicated by block 104 and cycle processing commences as indicated in block 106.

In block 108, a customer delivery summary file (Cust Summary File) 110 is created. This file contains information regarding the subscriber's delivery preferences. This file is created using information obtained from the customer master 78 and line xref 80. In block 112, a marketing message file 114 is created. The marketing message represented in the marketing message file may, for instance, be a logo, company name or other message and will later be placed on the output reports. This message is typically created by the telephone company. The customer delivery summary file (Cust Summary File) 110 and marketing message file 114 are then merged into a single summary/message file 116, which is used to determine whether the reports will be delivered to the subscriber in paper form, on floppy disk, or via the Internet or other suitable mechanism as shown in block 118.

The report data can be delivered to the subscriber by any of a variety of methods. The subscriber chooses the delivery method. The three basic delivery methods described herein are the Internet, diskette and paper. Of course, other transmission methods may be used as well, such as by direct dial-up connection, wireless connection, etc.

Figure 6:
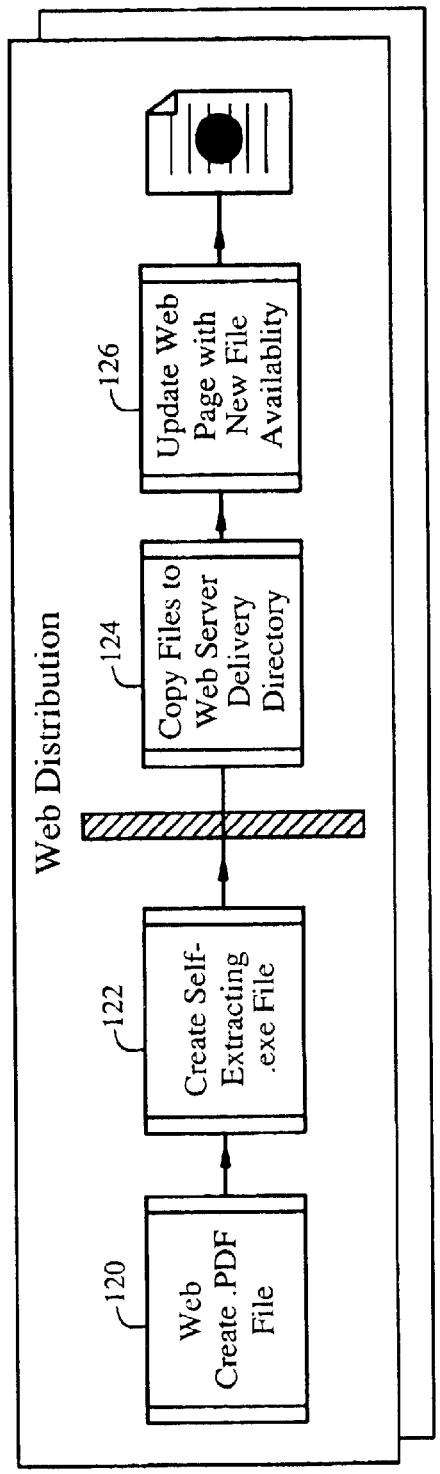
FIG. 6 is a functional block diagram illustrating one embodiment of web report distribution according to the present invention.
Figure 7:
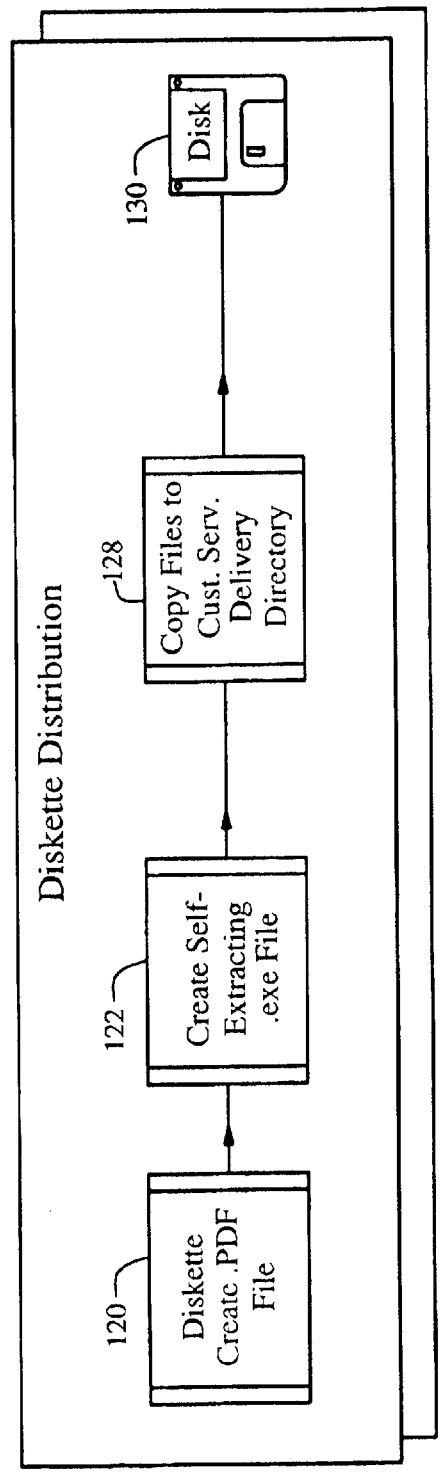
FIG. 7 is a functional block diagram illustrating one embodiment of diskette report distribution according to the present invention.

The Internet and diskette distribution methods are illustrated in FIGS. 6 and 7, respectively. FIGS. 6 and 7 correspond to the inputs to block 26 in FIG. 1. In both methods, first a file is created in an electronic reporting format, such as a .PDF (paper document format) file, as shown in block 120. Then a self-extracting .exe (executable) file is created, as shown in block 122. For web distribution, the files are then copied to the service provider's Internet server delivery directory, as shown in block 124. In block 126, the service provider's web page is updated to make the new files available to the subscriber. The subscriber can then retrieve the files at the service provider's web site. Illustratively, for diskette distribution, after the .PDF and .exe files are created, they are copied to the customer service delivery directory, as shown in block 128. The files are then copied to floppy disk 130 and delivered to the subscriber.

If the subscriber takes the paper delivery option, the service provider creates an ASCII printstream file and a .exe file. The service provider then generates the report according to the subscriber's instructions and delivers a paper copy to the subscriber.

Subscribers who choose web or diskette delivery are also illustratively provided with report-generating software, which they run on their own computer. The subscriber uses the report generating software to process the delivered data files, including the call detail records 90, and generate reports relating to the call detail data. The subscriber may, if desired, view the raw call detail records 90, a sample of which is provided in FIG. 8. The particular embodiment of call detail data illustrated in FIG. 8 includes the following fields: call date (CDATE) 132, call time (CTIME) 134, destination number (DN) 136, calling party number (CPN) 138, call type (CALL TYPE) 140 (incoming, outgoing), call disposition (CALL DISP) 142, call status (CALL STAT) 144, call duration (CALL DUR) 146 (in tenths of seconds), calling party name (CPN NAME) 148, postal (zip) code (POSTALCODE) 150 of the calling party, longitude 152 and latitude 154 of the calling party, and the value (Q BYTES) 156 assigned to the longitude/latitude specification. The call disposition ( call disp) 142 and call status (call stat) 144 fields work together to encode information about the call. For example, if call stat=1 and call disp=0, the call was answered. If call stat=0 and call disp=2, the line was busy. If call stat=0 and call disp=3, the call was not answered. Other items can be encoded as well.

The report generator is capable of producing multitudes of different reports in three basic formats: table, graph or map. Appendix A is illustrative of a main screen which a user of the report generator software would first encounter. A quick summary 158 provides a brief synopsis of the call detail data. In report period 160, the user can select the dates for which a given report or set of reports should be generated. Clicking on the "Change Dates" 162 button with a mouse pulls up a calendar, an illustrative example of which is provided in Appendix B. The user clicks on the dates on the calendar to select the report period. The user is not limited to viewing data from the most recent time period. Rather, data from previous time periods may also be included in the reports.

In the report set selection 164 box the user selects which reports should be generated. The user can choose among predefined sets of reports, determined by the service provider. These predefined report sets lump together various reports that may be useful for a specific purpose such as marketing or staffing, for example.

By clicking on the "customize report set" 166 button, the user can also customize a report set so that each time the software is run, a predefined set of reports, selected by the user, will be generated. Clicking on the "customize report set" 166 button pulls up a menu such as the one illustrated in Appendix C. The menu in Appendix C lists a variety of tables, graphs and maps. Other menus listing various other tables, graphs and maps can be accessed by clicking on the various buttons above the menu. To select which reports should be generated, the user clicks on the boxes 170 corresponding to the desired reports. In box 172, the user can select whether to have reports generated for incoming calls, outgoing calls, or both. At circle 174, the user can select to have reports generated for all of its lines, for a particular line, or for a selected group of lines.

Referring again to Appendix A, to view the selected reports, the user clicks on the "view reports" 176 button. Appendix D provides an example of a table generated by the system. The table lists all of the zip codes from which calls were received in the given time period for the first time, and ranks them in terms of number of calls. Such information may be useful in developing and analyzing marketing and advertising strategies. The data in this table could also be presented in graph form, as could the data from any generated table.

Appendix E provides an example of a graph generated by the system. The graph shows the quantity of the various call types (answered, busy, unanswered, unknown) received during each hour for the given day. Such information may be useful in making staffing decisions. Of course, the system can also be configured to suggest answers to such decisions. For example, the system can be programmed with any desired staffing or business parameters (such as a number of calls which can be serviced by an individual, and a maximum desired number of unanswered calls). With that information, the system can analyze the collected information and make recommendations, such as "Add an operator from 10:00 am to 1:00 pm on Thursdays" or "You average 20 unanswered calls between 6:00 am and 8:00 am. Modify store hours to accommodate incoming calls as early as 6:00 am." Any other desired parameters and recommendations can be implemented as well.

Some of the other tables and graphs that may be generated by the system include various information regarding, for example, top callers, top zip codes, new callers, call duration, unanswered calls and busy signals. Of course, all of this data can be reported for either incoming calls, outgoing calls, or both.

Many reports can also be generated in map form. Appendix F provides an example of a map generated by the system. The map indicates the zip codes from which the most calls were received by color-coding each zip code according to the quantity of calls.

The software can place each call or caller on a map at its precise geocoded longitude and latitude. Appendix G provides an example of a map that utilizes geocoded information. The map shows all incoming calls for the stated time period and indicates which day they were placed using color-coding. A square is placed for each call at the exact longitude and latitude determined by the geocoding process of block 86 in FIG. 4. Using geocoded data, the system can also map the location of, for example, top callers, new callers, unanswered calls and calls that received a busy signal.

Although the present invention has been described with reference to preferred embodiments, workers skilled in the art will recognize that changes may be made in form and detail without departing from the spirit and scope of the invention.

What is claimed is:

1. A method for reporting calls having associated call transaction data, the calls being from a call originator to a call recipient, the method comprising:

accessing the call transaction data, including at least one of a plurality of possible call originator location parameters;

correlating one or more of a plurality of possible call originator location parameters provided with the call transaction data with one or more of a plurality of stored location parameters;

determining an approximate longitude and latitude of the call originator for each call based on a closest correlation of the stored location parameters and the call originator location parameters associated with the call transaction;

assigning a value to the determined longitude and latitude, the value indicating a degree of accuracy of the determined longitude and latitude; and storing the approximate longitude and latitude.

2. The method of claim 1 and further comprising:

generating a statistical report related to the call transaction data and including the approximate longitude and latitude of the call originator for each call.

3. The method of claim 2 wherein the call originator location parameters for a given call include a postal code of the call originator for the given call, and wherein:

correlating comprises comparing at least the postal code of the call originator for the given call to the stored location parameters; and determining an approximate longitude and latitude comprises identifying the longitude and latitude associated with the stored location parameter matching the postal code of the call originator.

4. The method of claim 3 wherein identifying the longitude and latitude comprises identifying the longitude and latitude of a geographic centroid of an area defined by the postal code.

5. The method of claim 1 wherein the call originator location parameters include an area code of a telephone line number of the call originator, and wherein:

correlating comprises comparing at least the area code of the call originator for the given call to the stored location parameters; and determining an approximate longitude and latitude comprises identifying the longitude and latitude associated with the stored location parameter matching the area code of the call originator.

6. The method of claim 5 wherein identifying the longitude and latitude comprises identifying the longitude and latitude of a geographic centroid of an area defined by the area code.

7. The method of claim 1 wherein the call originator location parameters comprise an area code and exchange code of a telephone line number of the call originator, and wherein:

correlating comprises comparing at least the area code and exchange code of the call originator for the given call to the stored location parameters; and determining an approximate longitude and latitude comprises identifying the longitude and latitude associated with the stored location parameter matching the area code and exchange code of the telephone line number of the call originator.

8. The method of claim 7 wherein identifying the longitude and latitude comprises identifying the longitude and latitude of a geographic centroid of an area defined by the area code and exchange code.

9. The method of claim 1 further comprising providing a geographic map identifying the approximate longitude and latitude of the call originator for a given call.

10. The method of claim 1 wherein the call originator location parameters of the call transaction data include a postal code of the call originator, the method further comprising obtaining a nine-digit database including a plurality of approximate longitudes and latitudes, each corresponding to a particular nine-digit postal code, and obtaining a five-digit database including a plurality of approximate longitudes and latitudes, each corresponding to a particular five-digit postal code, and the determining step further comprising:

if the postal code is contained in the nine-digit database, assigning the corresponding longitude and latitude from the nine-digit database to the call; and if the postal code is not contained in the nine-digit database, but a first five digits of the postal code are contained in the five-digit database, assigning the corresponding longitude and latitude from the five-digit database to the call.

11. The method of claim 10 further comprising obtaining a three-digit database including a plurality of approximate longitudes and latitudes, each corresponding to a particular three-digit postal code, the determining step further comprising:

if the postal code is not contained in the nine-digit database or the five-digit database, but the first three digits of the postal code are contained in the three-digit database, assigning the corresponding longitude and latitude from the three-digit database to the call.

12. The method of claim 11 wherein the call originator location parameters of the call transaction data include a telephone line number of the call originator and further comprising obtaining an exchange code database including a plurality of approximate longitudes and latitudes, each corresponding to a particular area code and exchange code, and the determining step further comprising:

if the postal code is not contained in the nine-digit database, the first five digits of the postal code are not contained in the five-digit database, and the first three digits of the postal code are not contained in the three-digit database, but the first six digits of the telephone line number are contained in the exchange code database, assigning the corresponding longitude and latitude from the exchange code database to the call.

13. The method of claim 12, further comprising obtaining an area code database including a plurality of approximate longitudes and latitudes, each corresponding to a particular area code, and the determining step further comprising:

if the postal code is not contained in the nine-digit database, the first five digits of the postal code are not contained in the five-digit database, the first three digits of the postal code are not contained in the three-digit database, and the first six digits of the telephone line number are not contained in the exchange code database, but the first three digits of the telephone line number are contained in the area code database, assigning the corresponding longitude and latitude from the area code database to the call.

14. The method of claim 13, the determining step further comprising:

if the postal code is not contained in the nine-digit database, the first five digits of the postal code are not contained in the five-digit database, the first three digits of the postal code are not contained in the three-digit database, the first six digits of the telephone line number are not contained in the exchange code database, and the first three digits of the line number are not contained in the area code database, assigning a special longitude and latitude, indicating unknown origin, to the call.

15. The method of claim 1 wherein the call originator location parameters of the call transaction data include a postal code of the call originator and a telephone line number of the call originator, the postal code containing one of fewer than five digits, between five and nine digits, or more than nine digits, the method further comprising obtaining an exchange code database including a plurality of approximate longitudes and latitudes, each corresponding to a particular area code and exchange code, and obtaining an area code database including a plurality of approximate longitudes and latitudes, each corresponding to a particular area code, and the determining step further comprising:

If the first six digits of the telephone line number are contained in the exchange code database, assigning the corresponding longitude and latitude from the exchange code database to the call; and if the first six digits of the line number are not contained in the exchange code database, but the first three digits of the line number are contained in the area code database, assigning the corresponding longitude and latitude from the area code database to the call.

16. The method of claim 15, the determining step further comprising:

if the first six digits of the telephone line number are not contained in the exchange code database, and the first three digits of the line number are not contained in the area code database, assigning a special longitude and latitude, indicating unknown origin, to the call.

* * * * *

UNITED STATES PATENT AND TRADEMARK OFFICE
CERTIFICATE OF CORRECTION

PATENT NO. : 6,980,631 B1
DATED : December 27, 2005
INVENTOR(S) : Kirk C. Danzl et al.

It is certified that error appears in the above-identified patent and that said Letters Patent is hereby corrected as shown below:

Column 1,
Line 42, after "(DRS)" insert -- . --.

Column 4,
Line 66, after "line" delete "is".

Column 5,
Line 60, after "master" insert -- 78 --.

Column 7,
Lines 38-39, after "If" delete "(customer/line accums) the accumulator" and insert -- the accumulator (customer/line accums) --.

Column 8,
Line 1, after "as" delete "a".
Line 29, delete "(CALL TYPE)" and insert -- (CALL_TYPE) --.
Line 30, delete "(CALL DISP)" and insert -- (CALL_DISP) --.
Line 30, delete "(CALL STAT)" and insert -- (CALL_STAT) --.
Line 31, delete "(CALL DUR)" and insert -- (CALL_DUR) --.
Line 32, delete "(CPN NAME)" and insert -- (CPN_NAME) --.
Line 34, delete "(Q BYTES)" and insert -- (Q_BYTES) --.
Line 36, delete "( call disp)" and insert -- (call_disp) --.
Line 36, delete "(call stat)" and insert -- (call_stat) --.
Line 38, delete "call stat" and insert -- call_stat --.
Line 38, delete "call disp" and insert -- call_disp --.
Line 39, delete "call stat" and insert -- call_stat --.
Line 39, delete "call disp" and insert -- call_disp --.
Line 40, delete "call stat" and insert -- call_stat --.
Line 40, delete "call disp" and insert -- call_disp --.
Line 57, after "box" insert -- , --.

UNITED STATES PATENT AND TRADEMARK OFFICE
CERTIFICATE OF CORRECTION

PATENT NO. : 6,980,631 B1
DATED : December 27, 2005
INVENTOR(S) : Kirk C. Danzl et al.

It is certified that error appears in the above-identified patent and that said Letters Patent is hereby corrected as shown below:

Column 12,
Line 34, delete "If" insert -- if --.

Signed and Sealed this

Thirtieth Day of May, 2006

JON W. DUDAS
*Director of the United States Patent and Trademark Office*